(12) United States Patent
Statchuk

(10) Patent No.: US 10,747,824 B2
(45) Date of Patent: Aug. 18, 2020

(54) BUILDING A DATA QUERY ENGINE THAT LEVERAGES EXPERT DATA PREPARATION OPERATIONS

(71) Applicant: International Business Machines Corporation, Armonk, NY (US)

(72) Inventor: Craig A. Statchuk, Kars (CA)

(73) Assignee: International Business Machines Corporation, Armonk, NY (US)

(\*) Notice: Subject to any disclaimer, the term of this patent is extended or adjusted under 35 U.S.C. 154(b) by 833 days.

(21) Appl. No.: 15/370,839

(22) Filed: Dec. 6, 2016

(65) Prior Publication Data
US 2018/0157749 A1   Jun. 7, 2018

(51) Int. Cl.
| G06F 7/00 | (2006.01) |
| G06F 16/951 | (2019.01) |
| G06F 16/35 | (2019.01) |
| G06F 16/31 | (2019.01) |
| G06F 16/332 | (2019.01) |
| G06F 17/00 | (2019.01) |
| G06N 20/00 | (2019.01) |

(52) U.S. Cl.
CPC ......... *G06F 16/951* (2019.01); *G06F 16/316* (2019.01); *G06F 16/3322* (2019.01); *G06F 16/35* (2019.01); *G06N 20/00* (2019.01)

(58) Field of Classification Search
CPC ... G06F 16/951; G06F 16/3322; G06F 16/316
See application file for complete search history.

(56) References Cited

U.S. PATENT DOCUMENTS

| 6,338,096 B1* | 1/2002 | Ukelson | H04L 29/06 719/319 |
| 6,421,665 B1* | 7/2002 | Brye | G06F 16/2462 707/999.002 |
| 2006/0248039 A1* | 11/2006 | Brooks | G06F 16/31 707/999.001 |
| 2008/0183685 A1* | 7/2008 | He | G06F 16/24575 707/999.004 |
| 2014/0025626 A1 | 1/2014 | Mefford et al. | |
| 2015/0026153 A1 | 1/2015 | Gupta et al. | |
| 2015/0058315 A1 | 2/2015 | Heidasch et al. | |
| 2015/0095303 A1 | 4/2015 | Sonmez et al. | |
| 2015/0169746 A1 | 6/2015 | Hatami-Hanza | |
| 2017/0364920 A1* | 12/2017 | Anand | H04L 63/0861 |

\* cited by examiner

*Primary Examiner* — Kannan Shanmugasundaram
(74) *Attorney, Agent, or Firm* — Robert A. Voigt, Jr.; Winstead PC

(57) ABSTRACT

A method, system and computer program product for building a data query engine. Initial taxonomies that describe and categorize data are built by expert users (e.g., data scientists) employing machine learning algorithms. The data is also indexed and stored in an index. Queries are then received from non-expert users to query the data based on data categorization from built taxonomies and the indexing. After the queries are executed using the machine learning algorithms in an environment (e.g., Hadoop®), the results of the queries are rated for relevance, precision and accuracy. The machine learning algorithms are also rated based on the number of successful queries. Those machine learning algorithms with a rating above a threshold are identified to be utilized to scan new data to be stored in the index to provide a new environment that replaces the initial environment.

15 Claims, 5 Drawing Sheets

BUILDING A DATA QUERY ENGINE THAT LEVERAGES EXPERT DATA PREPARATION OPERATIONS

TECHNICAL FIELD

The present invention relates generally to data analytics, and more particularly to leveraging expert data preparation operations to build a data query engine with the speed and accuracy of earlier online analytical processing systems combined with the flexibility of faceted searches that allows more users to explore and filter data across arbitrary and ad hoc reporting dimensions.

BACKGROUND

In the field of data analytics, the analysis of the data is a process of inspecting, cleaning, transforming, and modeling data with the goal of discovering useful information, suggesting conclusions, and supporting decision-making. Data analysis has multiple facets and approaches, encompassing diverse techniques under a variety of names, in different business, science, and social science domains.

One tool used in data analytics is known as the "enterprise search." Enterprise search is the practice of making content from multiple enterprise-type sources, such as databases and intranets, searchable to a defined audience. Enterprise search is used to describe the software of search information within an enterprise (though the search function and its results may still be public). Enterprise search can be contrasted with a web search, which applies search technology to documents on the open web, and a desktop search, which applies search technology to the content on a single computer. The enterprise search focuses on the leveraging value from unstructured text. However, setting up an effective enterprise search strategy is difficult and does not match the consumer search experience on the web.

A newer tool has been developed to address some of the deficiencies of the enterprise search which is referred to herein as the "search oriented business intelligence." The search oriented business intelligence tool shifts the focus away from unstructured text in favor of structured data. Searches utilizing the search oriented business intelligence tool can target any type of data. Furthermore, advancements in areas, such as natural language processing and deep learning, have improved the search functions beyond simple keyword searches in recent years.

The results of the search oriented business intelligence tool can be made available in either a structured format (e.g., Structured Query Language (SQL), online analytical processing (OLAP), Excel®), a semi-structured format (e.g., Javascript® Object Notation (JSON), Extensible Markup Language (XML)) or an unstructured format.

Hence, the search oriented business intelligence tool allows for better reporting with less data modeling and data preparation.

However, the search oriented business intelligence tool exhibits: poor relevance scoring and results prioritization, incorrect concept and semantic associations that impact filtering and finding related content, limited system of record interfacing, slow to adapt to new types of data, and limited support for web data.

As a result, while the search oriented business intelligence tool allows for better reporting with less data modeling and data preparation, it is deficient in terms of accurately representing the understanding, such as from data scientists, while allowing end users to easily explore and filter data across arbitrary and ad hoc reporting dimensions.

SUMMARY

In one embodiment of the present invention, a method for building a data query engine comprises indexing and storing data in an index. The method further comprises receiving queries to query the data based on data categorization from built taxonomies and the indexing, where the taxonomies describe and categorize the data using machine language algorithms from a machine learning engine. The method additionally comprises executing the queries using the machine language algorithms from the machine learning engine in an environment.

Furthermore, the method comprises rating, by a processor, results of the queries for relevance, precision and accuracy. Additionally, the method comprises rating, by the processor, the machine language algorithms from the machine learning engine based on number of successful queries, wherein the number of successful queries are based on the rating assigned to the queries. In addition, the method comprises identifying, by the processor, those machine learning algorithms from the machine learning engine with a rating above a threshold. The method further comprises utilizing, by the processor, those identified machine learning algorithms to scan new data to be stored in the index to provide a new environment that replaces the environment.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for building a data query engine.

In one embodiment of the present invention, initial taxonomies that describe and categorize data are built by expert users (e.g., data scientists) employing machine learning algorithms. The data is also indexed and stored in an index, such as a full-text index. Queries are then received from non-expert users to query the data based on data categorization from built taxonomies and the indexing. After the queries are executed using the machine learning algorithms in an environment (e.g., Hadoop®, Spark®), the results of the queries are rated for relevance, precision and accuracy. The machine learning algorithms are also rated based on the number of successful queries, where the number of successful queries is based on the rating assigned to the queries. Those machine learning algorithms with a rating above a threshold are identified to be utilized to scan new data to be stored in the index to provide a new environment that replaces the initial environment (e.g., Hadoop®, Spark®). In this manner, expert data preparation operations may be leveraged to build a data query engine with the speed and accuracy of earlier online analytical processing systems combined with the flexibility of faceted searches that allows more users to explore and filter data across arbitrary and ad hoc reporting dimensions.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
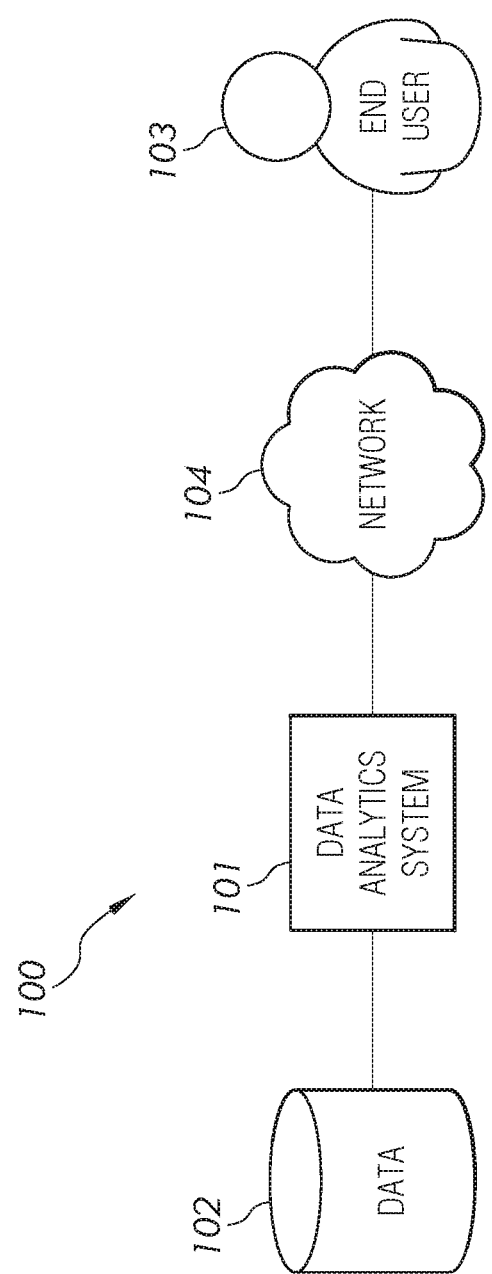
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. System 100 includes a data analytics system 101 configured to analyze data 102. Such analysis includes, but not limited to, inspecting, cleaning, transforming, and modeling data with the goal of discovering useful information, suggesting conclusions, and supporting decision-making. In one embodiment of the present invention, data analytics system 101 utilizes a technique, referred to herein as the "search optimized data analytics (SODA)," which extends the notion of structured and unstructured searches to include data preparation, shaping and analytics (analytics, as used herein, refers to functions and processes that transforms and reshapes data). A more detailed discussion regarding SODA is provided further below. Data analytics system 101 may include a computer cluster (set of loosely or tightly connected computers that work together so that, in many respects, they can be viewed as a single system) or a single computing system. A description of the hardware configuration of data analytics system 101 in the embodiment of a single computing system is provided below in connection with FIG. 2.

Furthermore, system 100 includes one or more end users 103 connected to data analytics system 101 via a network 104 using a computing device. The computing device may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to data analytics system 101 via network 104.

Network 104 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 is not to be limited in scope to any one particular network architecture. System 100 may include any number of data analytics systems 101, end users 103 and networks 104.

Figure 2:
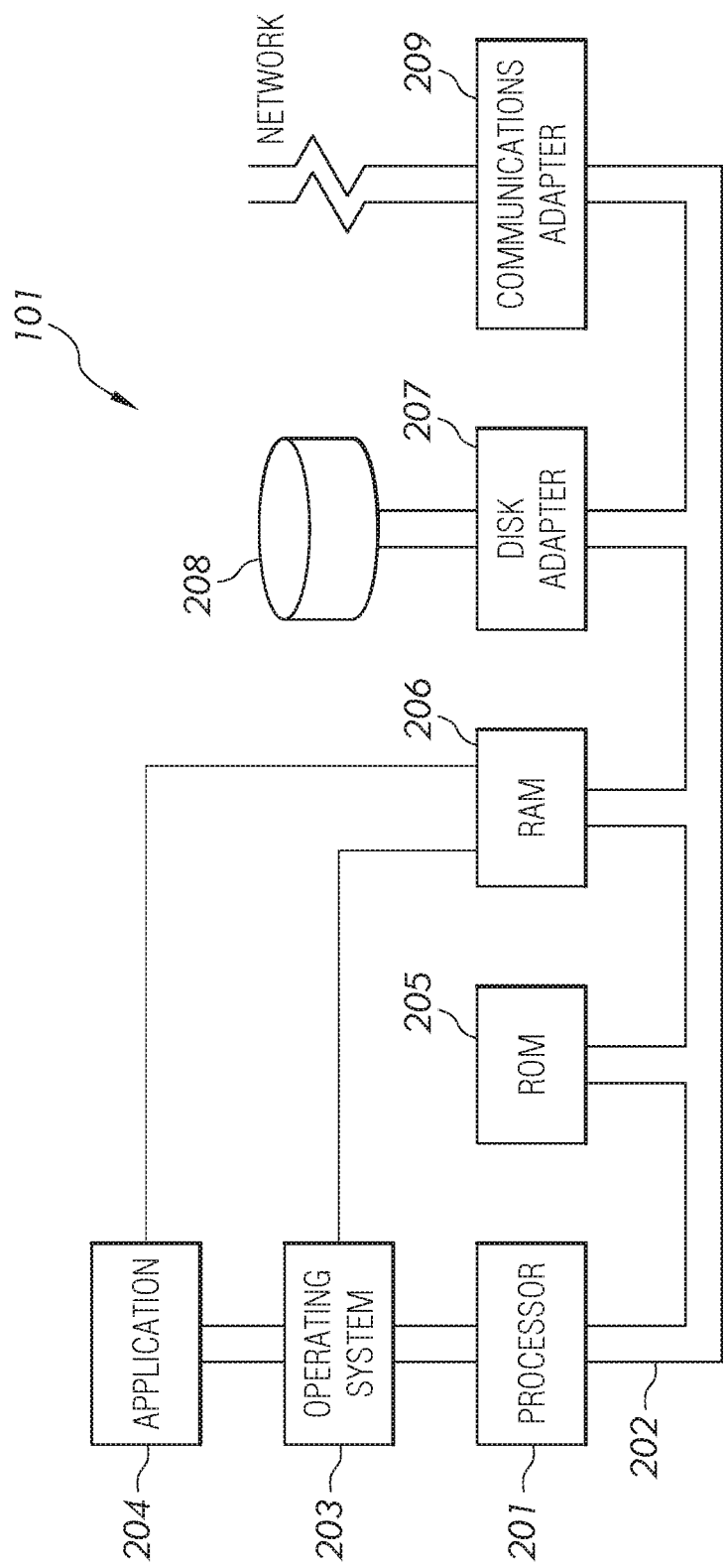
FIG. 2 illustrates a hardware configuration of a data analytics system in accordance with an embodiment of the present invention.

Referring now to FIG. 2, FIG. 2 illustrates a hardware configuration of data analytics system 101 (FIG. 1) which is representative of a hardware environment for practicing the present invention. Referring to FIG. 2, data analytics system 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, an application for building a data query engine that leverages expert data preparation operations as discussed further below in connection with FIGS. 3-5.

Referring again to FIG. 2, read-only memory ("ROM") 205 is coupled to system bus 202 and includes a basic input/output system ("BIOS") that controls certain basic functions of data analytics system 101. Random access memory ("RAM") 206 and disk adapter 207 are also coupled to system bus 202. It should be noted that software components including operating system 203 and application 204 may be loaded into RAM 206, which may be data analytics system's 101 main memory for execution. Disk adapter 207 may be an integrated drive electronics ("IDE") adapter that communicates with a disk unit 208, e.g., disk drive.

Data analytics system 101 may further include a communications adapter 209 coupled to bus 202. Communications adapter 209 interconnects bus 202 with an outside network (e.g., network 104 of FIG. 1) thereby enabling data analytics system 101 to communicate with end user 103 (FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, the search oriented business intelligence tool allows for better reporting with less data modeling and data preparation. However, the search oriented business intelligence tool exhibits: poor relevance scoring and results prioritization, incorrect concept and semantic associations that impact filtering and finding related content, limited system of record interfacing, slow to adapt to new types of data, and limited support for web data. As a result, while the search oriented business intelligence tool allows for better reporting with less data modeling and data preparation, it is deficient in terms of accurately representing the understanding, such as from data scientists, while allowing end users to easily explore and filter data across arbitrary and ad hoc reporting dimensions.

Figure 3:
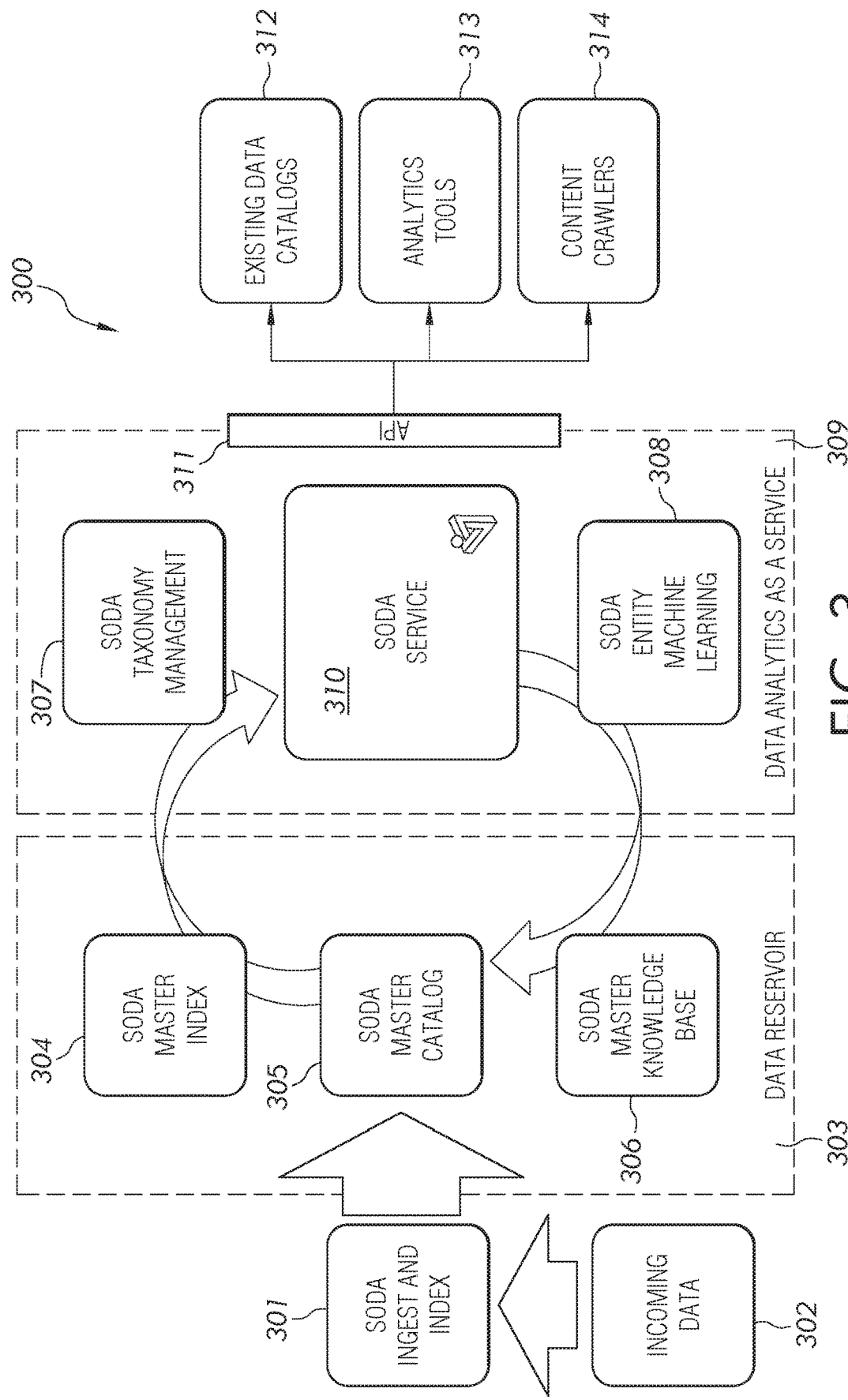
FIG. 3 is diagram of the software components of the search optimized data analytics (SODA) tool in accordance with an embodiment of the present invention.
Figure 4:
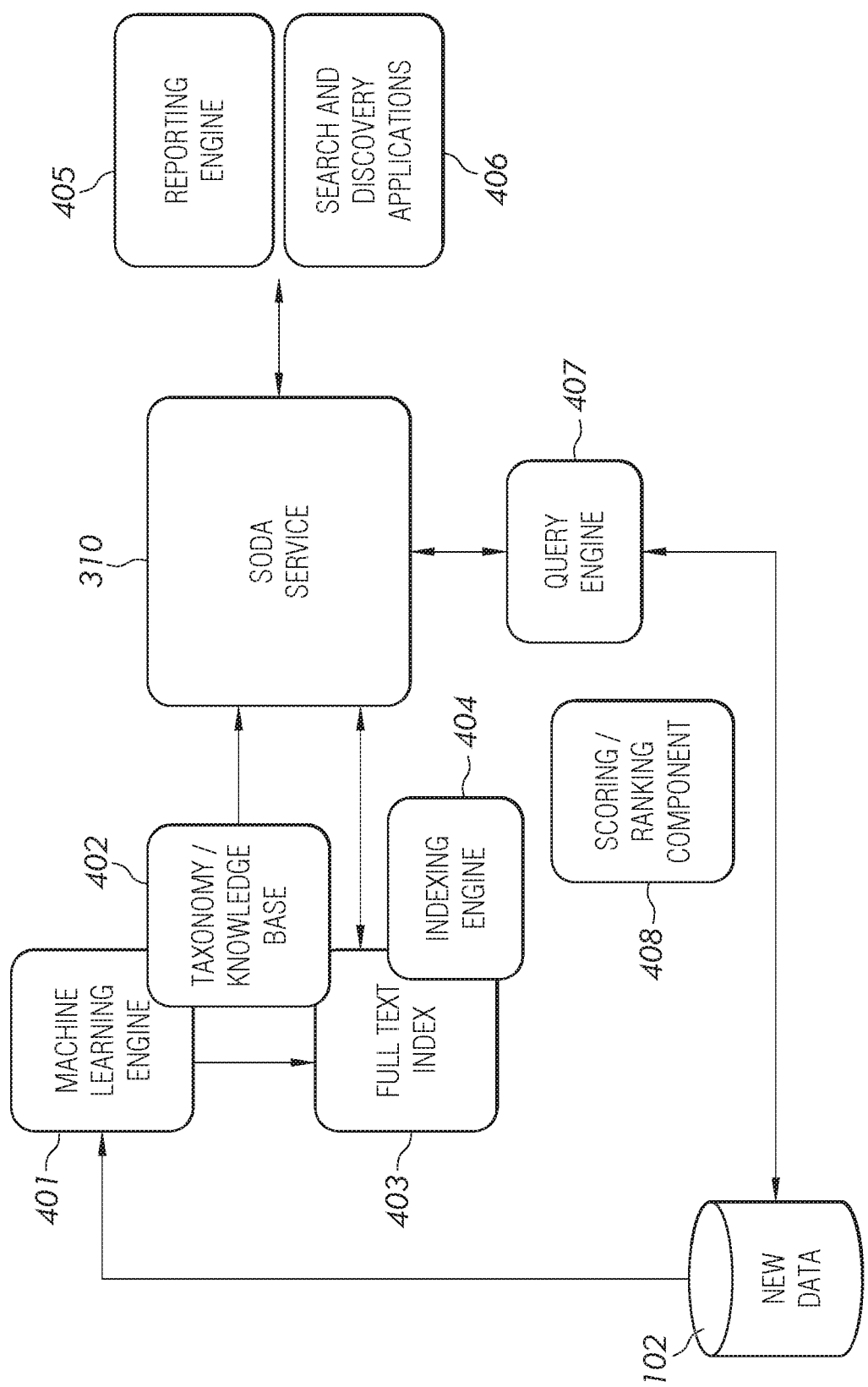
FIG. 4 is a diagram of the software components utilizing the SODA service so as to leverage expert data preparation operations to build a data query engine in accordance with an embodiment of the present invention.
Figure 5:
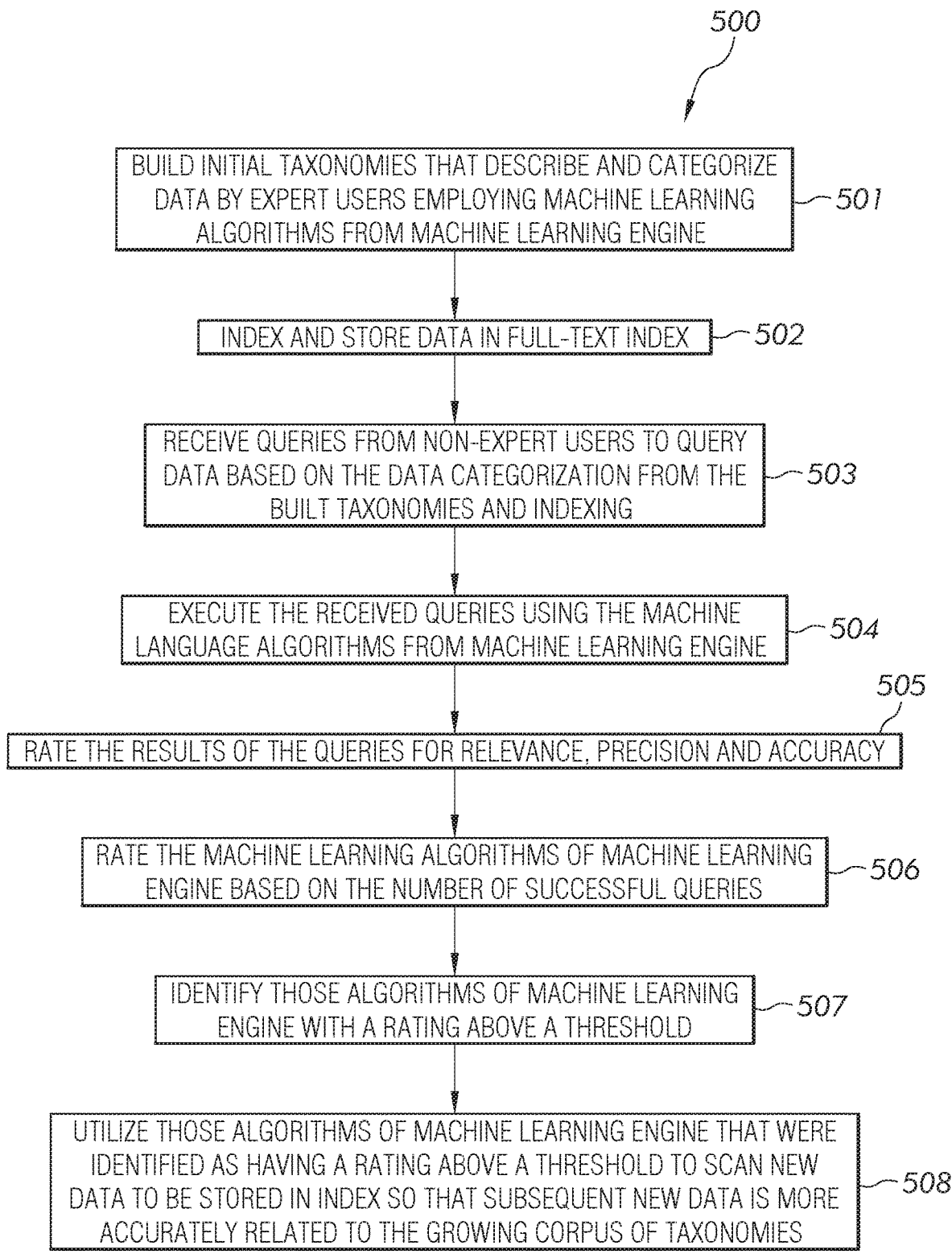
FIG. 5 is a flowchart of a method for leveraging expert data preparation operations to build a data query engine with the speed and accuracy of earlier online analytical processing systems combined with the flexibility of faceted searches that allows more users to explore and filter data across arbitrary and ad hoc reporting dimensions in accordance with an embodiment of the present invention.

The principles of the present invention provide a means for leveraging expert data preparation operations to build a data query engine with the speed and accuracy of earlier online analytical processing systems combined with the flexibility of faceted searches that allows more users to explore and filter data across arbitrary and ad hoc reporting dimensions as discussed below in association with FIGS. 3-5. FIG. 3 is diagram of the software components of the search optimized data analytics (SODA) tool. FIG. 4 is a diagram of the software components utilizing the SODA service so as to leverage expert data preparation operations to build a data query engine. FIG. 5 is a flowchart of a method for leveraging expert data preparation operations to build a data query engine with the speed and accuracy of earlier online analytical processing systems combined with the flexibility of faceted searches that allows more users to explore and filter data across arbitrary and ad hoc reporting dimensions.

As stated above, FIG. 3 is diagram of the software components of the search optimized data analytics (SODA) tool 300 in accordance with an embodiment of the present invention. In one embodiment, these software components may reside in application 204 (FIG. 2) of data analytics system 101.

Prior to the discussion of FIG. 3, a brief discussion of SODA is deemed appropriate.

SODA extends the notion of structured and unstructured searches to include data preparation, shaping and analytics (analytics referring to the functions and processes that transform and reshape data). With its focus on data, SODA becomes an information and knowledge enrichment platform that strives to improve and refine understanding as an integral part of an enterprise workflow. It can address both proactive and responsive information technology (IT) needs. It gives technology buyers and builders a faster way to organize and deploy solutions using data models and query tools, including SQL and NoSQL. It gives self-serve and line-of-business (LOB) users familiar search tools that support both information discovery and refinement. In all cases, sharing is an integral part of the system. The model and query capabilities simplify integration with tools, such as Watson Analytics™, BigInsights®, SPSS® and Cognos® BI. Added flexibility means more powerful and complete analytics in solutions, such as banking and risk, where many parts of an application are built without utilizing pre-existing software modules.

Referring to FIG. 3, SODA 300 includes a SODA ingest and index 301, where structured and unstructured data 302 enters a data reservoir 303 via ingest and index 301. In one embodiment, SODA ingest and index 301 consumes data or maintains references to data as it is imported into SODA index 301. In one embodiment, full-text index 301 stores traditional keyword to content references by first tokenizing and then adding location offsets to the inverted search list. In one embodiment, keywords are indexed by columns and equivalent metadata to create search facets. In one embodiment, phrases and keyword groups are used to build text clusters.

Data reservoir 303 includes a master index 304, a master catalog 305 and a master knowledge base 306 which are bootstrapped and continuously updated to meet emerging information and knowledge enrichment platform requirements. With its focus on data, SODA becomes an information and knowledge enrichments platform that strives to improve and refine understanding as an integral part of an enterprise workflow.

In one embodiment, SODA master index 304 stores information from SODA ingest and index 301 that can be searched by keyword and filtered by facet or cluster. In one embodiment, SODA master catalog 305 is preloaded with business intelligence and related information technology metadata that describes logical relationships between data. This metadata also preloads the facet tree of SODA master index 304. New data added to index 304 is similarly used to update catalog 305.

In one embodiment, SODA master knowledge base 306 includes a graph to store all relations between named entities. In one embodiment, it is the de facto definition of entities used in an enterprise (i.e., what terms are used and how they are semantically related). This knowledge graph is preloaded with an industry taxonomy and/or a by ingesting reports and data sources (e.g., OLAP cubes) to understand basic semantics relationships.

In one embodiment, each of these components 304-306 can be updated and refined by the SODA taxonomy management 307 and SODA entity machine learning 308 discussed below.

Data analytics as a service 309 is accomplished using SODA taxonomy management 307, SODA entity machine learning 308 and SODA service 310.

SODA service 310 coordinates incoming data ingestion and external information enrichment. In one embodiment, SODA service 310 provides optimized data analytics. It offers application programing interfaces (APIs) 311 that create data views in the best format and groupings available for a given analytics task or workflow. It also facilitates guided search and discovery by suggesting facets and related topics driven by context and previous activities.

SODA service APIs 311 enhance workflow of $3^{rd}$ party components by providing data views using the API that already work with existing applications and workflows. Examples include Representational state transfer (REST), SQL and NoSQL access methods.

In one embodiment, SODA taxonomy management 307 maintains taxonomy topic hierarchies that are continuously updated based on incoming data and matches with existing metadata (sometimes called data lineage). Results are shared via the SODA service API 311.

In one embodiment, SODA entity machine learning 308 uses all available data to continuously maintain entity relationships. These semantic connections ultimately improve the accuracy and performance of indexing, catalog and knowledge management components.

SODA tool 300 then exports the results to appropriate tools (e.g., existing data catalogs 312, analytics tools 313 and content crawlers 314).

SODA tool 300 is utilized to leverage expert data preparation operations to build a data query engine as discussed below in connection with FIG. 4.

FIG. 4 is a diagram of the software components utilizing SODA service 310 so as to leverage expert data preparation operations to build a data query engine in accordance with an embodiment of the present invention. In one embodiment, these software components may reside in application 204 (FIG. 2) of data analytics system 101.

The following provides a brief description of these software components. A more detailed description of these software components (including their functionalities) is provided below in conjunction with FIG. 5.

Referring to FIG. 4, the components (algorithms) of machine learning engine 401 are employed by expert users, such as data scientists and information technology (IT) preparation experts, to build initial taxonomies 402 that describe and categorize data 102.

The data that enters the system is indexed and stored in a full-text index 403 by indexing engine 404.

Non-expert users (e.g., reporting engine 405, search and discovery applications 406) are able to query data 102 using keywords, category facets or SQL based on the categorization from the built taxonomies 402 and indexing.

In one embodiment, the queries from the non-expert users are initially executed by query engine 407 using the machine language algorithms from machine learning engine 401 in an environment, such as Hadoop® or Spark®.

The results of the query from query engine 407 are then rated (i.e., scored) for relevance, precision and accuracy by scoring/ranking component 408. "Relevance," as used herein, refers to a result that is appropriate to the query. "Precision," as used herein, refers to a result that is absolutely correct and exact without including any non-relevant results to the query. "Accuracy," as used herein, refers to being correct in all details.

Scoring/ranking component 408 may further be configured to rate (i.e., score) the components (algorithms) of machine learning engine 401 based on the number of successful queries, where "success" may be determined based on the rating assigned to the queries for relevance, precision and accuracy by scoring/ranking component 408.

Those components (algorithms) of machine learning engine 401 that are the most useful, such as those with a rating above a threshold, which may be user-defined, are utilized by indexing engine 404 to scan new data 102 to be stored in index 403 so that subsequent new data is more accurately related to the growing corpus of taxonomies 402.

Subsequent queries can now use index 403 to provide the optimized discovery and reporting environment that replaces the previously used query environment (avoid using the Hadoop® or Spark® environment).

Referring now to FIG. 5, FIG. 5 is a flowchart of a method 500 for leveraging expert data preparation operations to build a data query engine with the speed and accuracy of earlier online analytical processing systems combined with the flexibility of faceted searches that allows more users to explore and filter data across arbitrary and ad hoc reporting dimensions in accordance with an embodiment of the present invention.

Referring to FIG. 5, in conjunction with FIGS. 1-4, in step 501, taxonomies 402 that describe and categorize data 102 are built by expert users (e.g., data scientists, IT data preparation experts) employing machine learning algorithms from machine learning engine 401. In one embodiment, these machine learning algorithms are created by such expert users.

In step 502, data analytics system 101 (indexing engine 404) indexes and stores data 102 in full-text index 403.

In step 503, data analytics system 101 (query engine 407) receives a query from non-expert users (e.g., reporting engine 405, search and discovery applications 406) to query data 102 using keywords, category facets or SQL based on the data categorization from the built taxonomies 402 and indexing.

In step 504, data analytics system 101 (query engine 407) executes the received query using the machine language algorithms from machine learning engine 401 in an environment, such as Hadoop® or Spark®.

In step 505, data analytics system 101 (scoring/ranking component 408) rates the results of the queries for relevance, precision and accuracy.

In step 506, data analytics system 101 (scoring/ranking component 408) rates the machine learning algorithms of machine learning engine 401 based on the number of successful queries, where "success" may be determined based on the rating assigned to the queries for relevance, precision and accuracy by scoring/ranking component 408.

In step 507, data analytics system 101 (scoring/ranking component 408) identifies those algorithms of machine learning engine 401 with a rating above a threshold, which may be user-defined.

In step 508, data analytics system 101 (indexing engine 404) utilizes those machine learning algorithms of machine learning engine 401 that were identified as having a rating above a threshold to scan new data 102 to be stored in index 403 so that subsequent new data is more accurately related to the growing corpus of taxonomies 402.

In this manner, subsequent queries can now use index 403 to provide the optimized discovery and reporting environment that replaces the previously used query environment (avoid using the Hadoop® or Spark® environment).

As a result, expert data preparation operations may be leveraged to build a data query engine with the speed and accuracy of earlier online analytical processing systems combined with the flexibility of faceted searches that allows more users to explore and filter data across arbitrary and ad hoc reporting dimensions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for building a data query engine, the method comprising:

indexing and storing data in an index;

receiving queries to query said data using category facets based on data categorization from built taxonomies and said indexing, wherein said taxonomies describe and categorize said data using machine language algorithms from a machine learning engine;

executing said queries by a query engine using said machine language algorithms from said machine learning engine in an environment, wherein a search optimized data analytics tool is utilized to leverage data preparation operations to build said query engine, wherein said search optimized data analytics tool comprises an ingest and index, wherein said ingest and index stores keyword to content references by tokenizing and adding location offsets to an inverted search list, wherein said keywords are indexed by columns and equivalent metadata to create search facets;

rating, by a processor, results of said queries for relevance, precision and accuracy, wherein said relevance is a result that is appropriate to a query, wherein said precision is a result that is absolutely correct and exact without including any non-relevant results to said query, wherein said accuracy is being correct in all details;

rating, by said processor, said machine language algorithms from said machine learning engine based on number of successful queries, wherein said number of successful queries are based on said rating assigned to said queries for said relevance, said precision and said accuracy;

identifying, by said processor, those machine learning algorithms from said machine learning engine with a rating above a threshold, wherein said threshold is user-defined;

utilizing, by said processor, those identified machine learning algorithms to scan new data to be stored in said index so that subsequent new data is more accurately related to a growing corpus of taxonomies; and providing a new environment that replaces said environment using said index with said new scanned data.

2. The method as recited in claim 1 further comprising:
offering application programming interfaces that create data views for a given analytics task or workflow.

3. The method as recited in claim 1 further comprising:
facilitating a guided search and discovery by suggesting facets and related topics driven by context and previous activities.

4. The method as recited in claim 1, wherein said queries are received from a reporting engine or search and discovery applications.

5. The method as recited in claim 1, wherein said index is a full-text index.

6. A computer program product for building a data query engine, the computer program product comprising a computer readable storage medium having program code embodied therewith, the program code comprising the programming instructions for:
indexing and storing data in an index;
receiving queries to query said data using category facets based on data categorization from built taxonomies and said indexing, wherein said taxonomies describe and categorize said data using machine language algorithms from a machine learning engine;
executing said queries by a query engine using said machine language algorithms from said machine learning engine in an environment, wherein a search optimized data analytics tool is utilized to leverage data preparation operations to build said query engine, wherein said search optimized data analytics tool comprises an ingest and index, wherein said ingest and index stores keyword to content references by tokenizing and adding location offsets to an inverted search list, wherein said keywords are indexed by columns and equivalent metadata to create search facets;
rating results of said queries for relevance, precision and accuracy, wherein said relevance is a result that is appropriate to a query, wherein said precision is a result that is absolutely correct and exact without including any non-relevant results to said query, wherein said accuracy is being correct in all details;
rating said machine language algorithms from said machine learning engine based on number of successful queries, wherein said number of successful queries are based on said rating assigned to said queries for said relevance, said precision and said accuracy;
identifying those machine learning algorithms from said machine learning engine with a rating above a threshold, wherein said threshold is user-defined;
utilizing those identified machine learning algorithms to scan new data to be stored in said index so that subsequent new data is more accurately related to a growing corpus of taxonomies; and
providing a new environment that replaces said environment using said index with said new scanned data.

7. The computer program product as recited in claim 6, wherein the program code further comprises the programming instructions for:
offering application programming interfaces that create data views for a given analytics task or workflow.

8. The computer program product as recited in claim 6, wherein the program code further comprises the programming instructions for:
facilitating a guided search and discovery by suggesting facets and related topics driven by context and previous activities.

9. The computer program product as recited in claim 6, wherein said queries are received from a reporting engine or search and discovery applications.

10. The computer program product as recited in claim 6, wherein said index is a full-text index.

11. A system, comprising:
a memory unit for storing a computer program for building a data query engine; and
a processor coupled to the memory unit, wherein the processor is configured to execute the program instructions of the computer program comprising:
indexing and storing data in an index;
receiving queries to query said data using category facets based on data categorization from built taxonomies and said indexing, wherein said taxonomies describe and categorize said data using machine language algorithms from a machine learning engine;
executing said queries by a query engine using said machine language algorithms from said machine learning engine in an environment, wherein a search optimized data analytics tool is utilized to leverage data preparation operations to build said query engine, wherein said search optimized data analytics tool comprises an ingest and index, wherein said ingest and index stores keyword to content references by tokenizing and adding location offsets to an inverted search list, wherein said keywords are indexed by columns and equivalent metadata to create search facets;
rating results of said queries for relevance, precision and accuracy, wherein said relevance is a result that is appropriate to a query, wherein said precision is a result that is absolutely correct and exact without including any non-relevant results to said query, wherein said accuracy is being correct in all details;
rating said machine language algorithms from said machine learning engine based on number of successful queries, wherein said number of successful queries are based on said rating assigned to said queries for said relevance, said precision and said accuracy;
identifying those machine learning algorithms from said machine learning engine with a rating above a threshold, wherein said threshold is user-defined;
utilizing those identified machine learning algorithms to scan new data to be stored in said index so that subsequent new data is more accurately related to a growing corpus of taxonomies; and
providing a new environment that replaces said environment using said index with said new scanned data.

12. The system as recited in claim 11, wherein the program instructions of the computer program further comprise:
offering application programming interfaces that create data views for a given analytics task or workflow.

13. The system as recited in claim 11, wherein the program instructions of the computer program further comprise:
facilitating a guided search and discovery by suggesting facets and related topics driven by context and previous activities.

14. The system as recited in claim 11, wherein said queries are received from a reporting engine or search and discovery applications.

15. The system as recited in claim 11, wherein said index is a full-text index.

\* \* \* \* \*